(12) United States Patent
Patterson (10) Patent No.: US 8,132,292 B2
(45) Date of Patent: Mar. 13, 2012

(54) HINGE MECHANISM FOR A WIRELESS COMMUNICATION DEVICE

(75) Inventor: Gregory S. Patterson, Morrisville, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 37 days.

(21) Appl. No.: 12/352,244

(22) Filed: Jan. 12, 2009

(65) Prior Publication Data

US 2009/0199364 A1    Aug. 13, 2009

Related U.S. Application Data

(60) Provisional application No. 61/027,537, filed on Feb. 11, 2008.

(51) Int. Cl.
*E05D 11/10* (2006.01)
(52) U.S. Cl. .......................................................... 16/340
(58) Field of Classification Search .................. 16/330, 16/357, 360, 361; 361/679.56
See application file for complete search history.

(56) References Cited

U.S. PATENT DOCUMENTS

| | | | | |
|---|---|---|---|---|
| 5,109,571 | A * | 5/1992 | Ohshima et al. ............... | 16/307 |
| 6,033,015 | A * | 3/2000 | Husted ..................... | 297/188.19 |
| 7,421,762 | B2 * | 9/2008 | Lu et al. ..................... | 16/328 |
| 2002/0147026 | A1 | 10/2002 | Hsieh | |
| 2003/0179880 | A1 * | 9/2003 | Pan et al. ................. | 379/433.13 |
| 2004/0020012 | A1 | 2/2004 | Gupte | |
| 2004/0055114 | A1 * | 3/2004 | Lu ................... | 16/340 |
| 2004/0216275 | A1 * | 11/2004 | Hayashi ......................... | 16/303 |
| 2005/0257343 | A1 * | 11/2005 | Gupte ............................ | 16/330 |
| 2006/0050867 | A1 * | 3/2006 | Kawamoto .............. | 379/433.13 |
| 2007/0067956 | A1 * | 3/2007 | Attride et al. .................. | 16/303 |
| 2008/0016649 | A1 * | 1/2008 | Lee et al. ....................... | 16/307 |

OTHER PUBLICATIONS

International Search Report mailed Jun. 7, 2009 re International Application No. PCT/US2009/033158 filed Feb. 5, 2009.

* cited by examiner

*Primary Examiner* — Victor Batson
*Assistant Examiner* — Matthew Sullivan
(74) *Attorney, Agent, or Firm* — Coats & Bennett, P.L.L.C.

(57) ABSTRACT

The present application is directed to a hinge for a clamshell-type wireless communication device or other electronic device. In one embodiment, the communication device includes a base portion and a flip portion. A hinge mechanism movably couples the flip portion to the base portion so that the flip portion may pivot between a closed position and an open position. The hinge mechanism comprises first and second hinge parts, an indexing pin, and a spring. The indexing pin is rotatable relative to the first hinge part about a pivot axis. Additionally, the indexing pin is movable axially along the pivot axis. The second hinge part is non-rotatably engaged with the indexing pin and is rotatable about the pivot axis relative to the first hinge part between closed and open positions. The spring applies both an axial force and a rotational force to the indexing pin. The axial force biases the indexing pin into contact with the first hinge part, and the rotational force rotates the indexing pin to move the second hinge part from the closed to the open position.

21 Claims, 5 Drawing Sheets

HINGE MECHANISM FOR A WIRELESS COMMUNICATION DEVICE

RELATED APPLICATION

This application claims the benefit of U.S. Provisional Patent Application 61/027,537 filed Feb. 11, 2008, which is incorporated herein by reference.

BACKGROUND

The present application relates generally to wireless communication devices having relatively movable housing portions and, more particularly, to a hinge mechanism for connecting the relatively movable housing portions.

Wireless communications devices, such as cellular telephones, personal digital assistants, and the like, frequently have two housing portions that are relatively moveable. For example, a common cell phone design is a so-called clamshell design, with a "flip" having a speaker and a display, and a base portion having a keypad and a microphone. The flip portion is connected to a base portion via a hinge. The flip portion rotates via the hinge between a closed position disposed proximate the base section in an overlying configuration and an open position where the flip and base are aligned end to end, similar to an open clamshell.

A variety of hinge mechanisms are available for connecting the two housings portions. Most, if not all hinges, generally include a device that yieldingly resists movement of the housings between the open and closed positions. For example, hinges that pivotably connect the two housings of a cellular telephone may include corresponding detents associated with each of the housings. The detents contact each other as the user pivots the housings between open and closed positions. This contact resists the pivoting motion, but yields when the user applies a proper amount of force. The detents also function to maintain the housings in the open and closed positions. Other hinges may include one or more springs that resist the pivoting motion of the housings. Once the user applies a proper amount of force, the springs yield to permit the housings to move to the open and closed positions.

For clamshell-type phones, the construction of the hinge is an important design consideration to provide mechanical strength and durability while maintaining a size small enough to fit into increasingly smaller housings. Additionally, the hinge affects how easily the user can open and close the phone. Often, the user has only one hand unencumbered when using the phone. Opening the flip may prove to be problematic because it may require the user to wedge a finger under an edge of the flip to pry it open. The user may find it difficult to hold the phone in one hand and simultaneously open it.

SUMMARY

The present application relates to a hinge for a clamshell-type wireless communication device or other electronic device. In one embodiment, the communication device includes a base portion and a flip portion. A hinge mechanism movably couples the flip portion to the base portion so that the flip portion may pivot between a closed position and an open position. The hinge mechanism comprises first and second hinge parts, an indexing pin, and a spring. The indexing pin is rotatable relative to the first hinge part about a pivot axis. Additionally, the indexing pin is movable axially along the pivot axis. The second hinge part is non-rotatably engaged with the indexing pin and is rotatable about the pivot axis relative to the first hinge part between closed and open positions. The spring applies both an axial force and a rotational force to the indexing pin. The axial force biases the indexing pin into contact with the first hinge part, and the rotational force rotates the indexing pin to move the second hinge part from the closed to the open position.

In one embodiment, the first hinge part and the indexing pin include mating indexing features which engage one another due to the axial force of the spring. The indexing features prevent rotation of the indexing pin and hold the second hinge part in the closed position.

DETAILED DESCRIPTION

Figure 1:
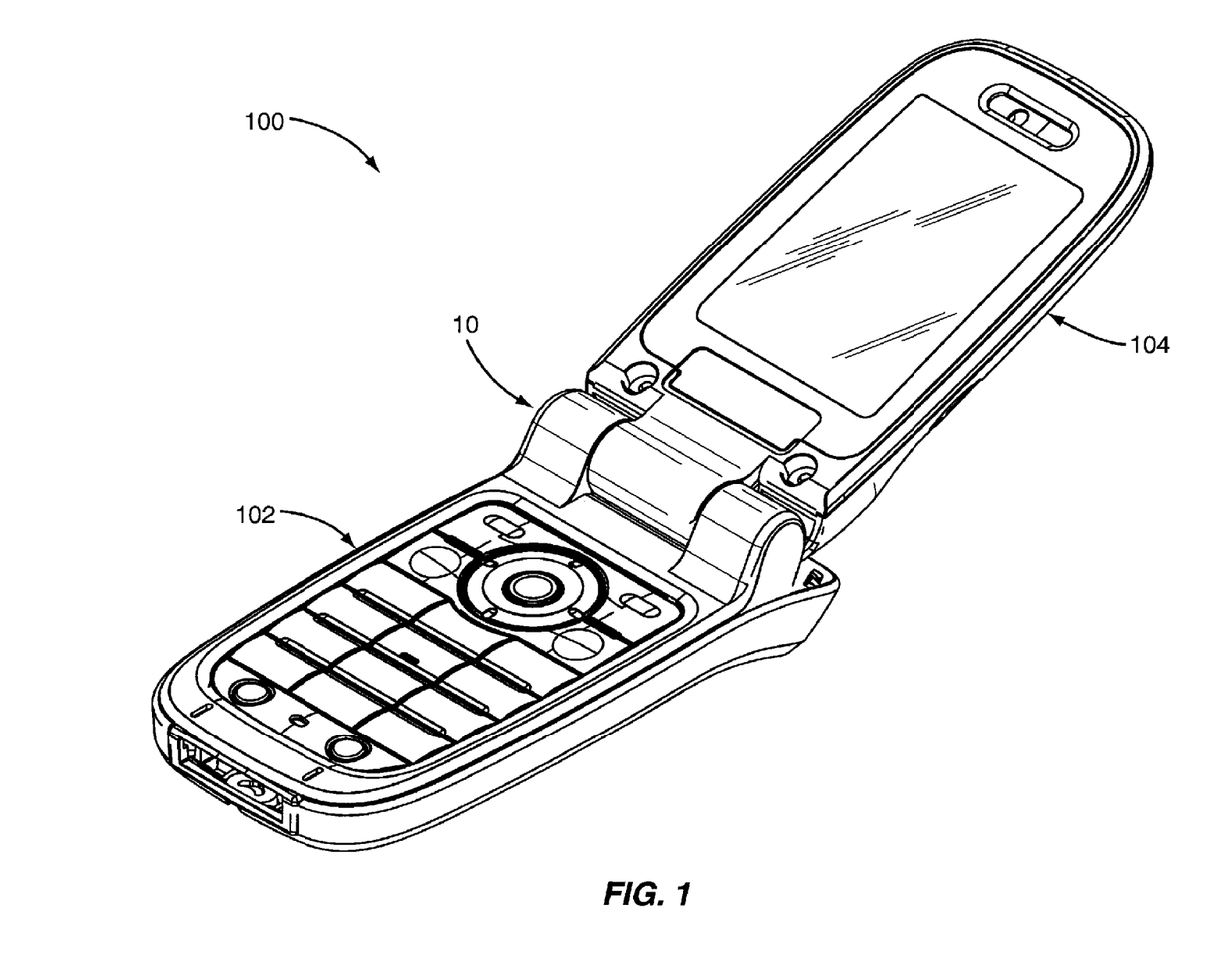
FIG. 1 is a clamshell-type cellular telephone including a hinge according to one embodiment.

The present application relates to a hinge for a clamshell-type wireless communication device, such as a cellular telephone. An exemplary wireless communication device is illustrated in FIG. 1 and generally indicated at 100. The cellular telephone 100 may include two housing sections referred to herein as a base portion 102 and a "flip" portion 104. Hinge portion 10 pivotally connects the base portion 102 and flip portion 104 so as to be movable relative to one another between open and closed positions. The present application includes a hinge mechanism activated by pressing a button on an outer surface of the cellular telephone 100 to automatically open the flip portion 104. While the exemplary embodiment illustrates a cellular telephone 100, those skilled in the art will readily appreciate that the present application can applied to other electronic devices, such as a personal digital assistant, media players, personal communication service devices, palm-top computers, laptop computers, and the like.

Figure 2:
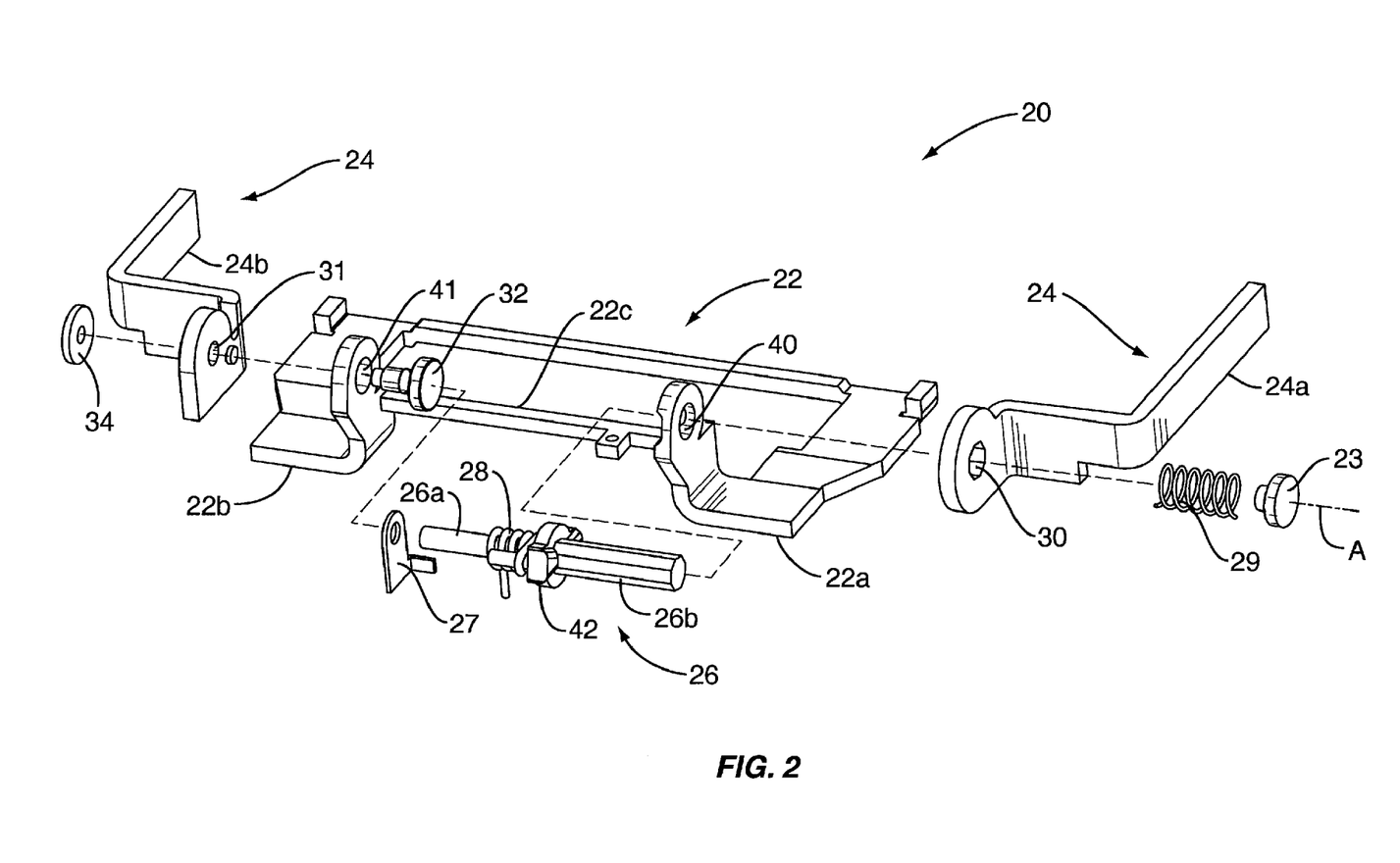
FIG. 2 is an exploded perspective view of a hinge mechanism according to one embodiment.

In one embodiment, the hinge portion 10 comprises a hinge mechanism 20 as illustrated in an exploded view in FIG. 2. The hinge mechanism 20 includes a first hinge part 22, second hinge part 24, indexing pin 26, and spring 28. The first hinge part 22 may attach to the flip portion 104 and supports the indexing pin 26 and the spring 28. The spring 28 applies a rotational force to the indexing pin 26, and the indexing pin 26 is rotatable about pivot axis A relative to the first hinge part 22. The second hinge part 24 is attached to the indexing pin 26 and is rotatable with the indexing pin 26. The indexing pin 26 is also movable laterally along the pivot axis A, and the spring 28 applies an axial force that biases the indexing pin 26 into contact with the first hinge piece 22. The indexing pin 26 and the first hinge part 22 may include mating indexing features which engage one another due to the axial force to stop the flip portion 104 at predetermined angular positions as will be hereinafter described.

The first hinge part 22 includes first and second supports 22a, 22b connected by a support bar 22c. The second hinge part 24 includes first and second arms 24a, 24b that pivotably connect to respective supports 22a, 22b. Indexing pin 26 rotatably connects the first arm 24a to the first support 22a. The first arm 24a and first support 22a include aligned openings 30, 40 to receive the indexing pin 26. A hinge pin 32 pivotably connects the second arm 24b to the second support 22b. The second arm 24b and second support 22b include aligned openings 31, 41, respectively, to receive the hinge pin 32. Locking washer 34 engages the hinge pin 32 to secure the second arm 24b to the second support 22b.

Figure 4:
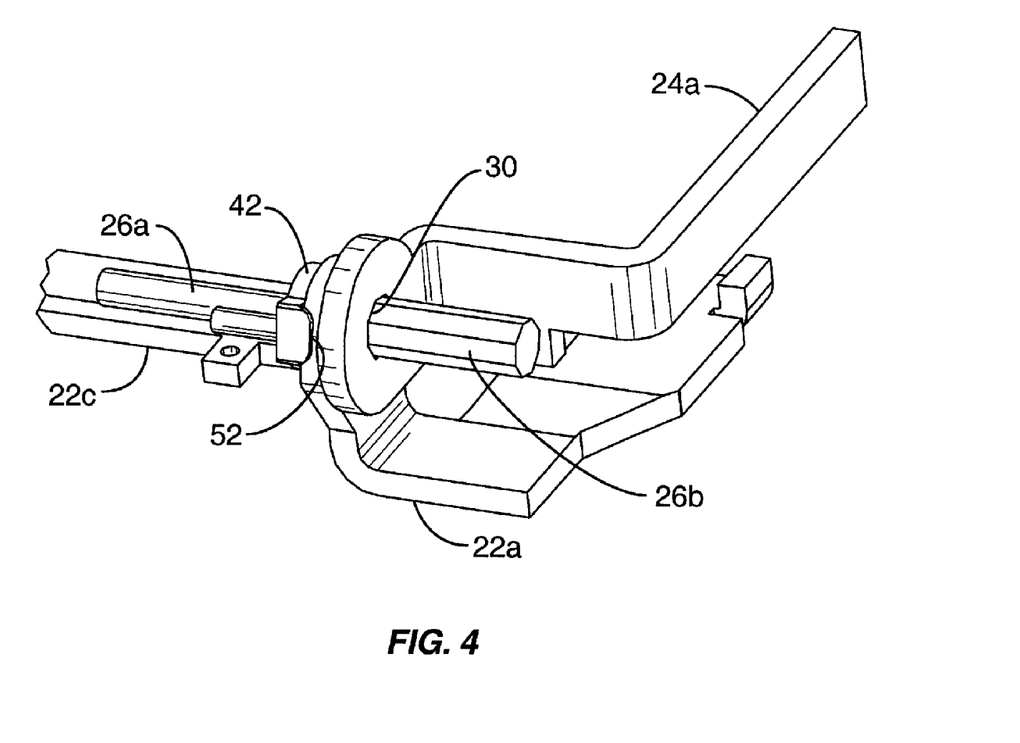
FIG. 4 is a perspective view of first and second hinge parts connected by an indexing pin according to one embodiment.
Figure 5:
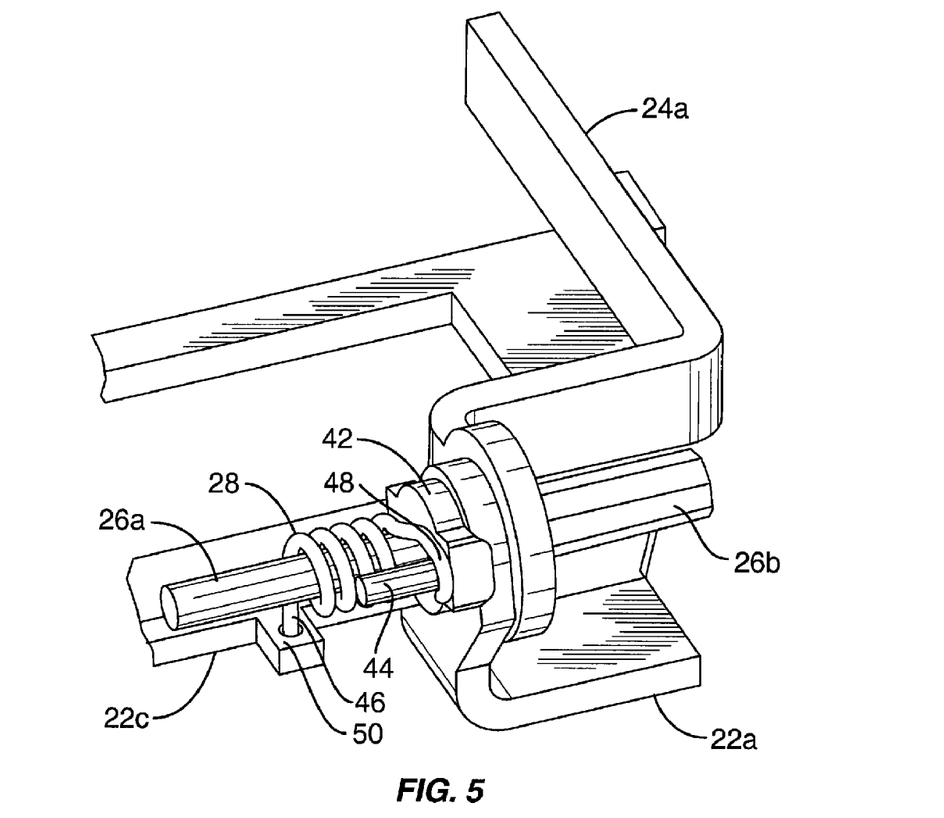
FIG. 5 is a perspective view of a portion of a hinge mechanism with a spring according to one embodiment.
Figure 8:
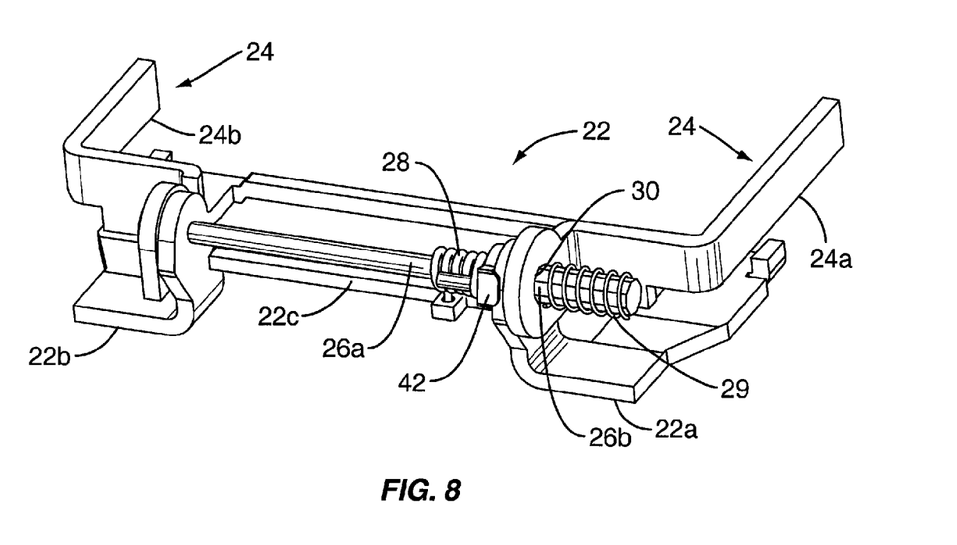
FIG. 8 is a perspective view of a hinge mechanism according to one embodiment.

FIGS. 4 and 5 illustrate the indexing pin 26 in more detail. The indexing pin 26 includes an inner portion 26a, outer portion 26b, and a flange 42. The inner portion 26a of the indexing pin 26 is rotatably journaled in the opening 40 of the first support 22a. The inner portion 26a has a generally round cross-sectional shape, and the opening 40 has a complementary shape to allow free rotation of the indexing pin 26 relative to the first hinge part 22. The inner portion 26a may be held in alignment by a bracket 27. In some embodiments, the bracket 27 may be eliminated as shown in FIG. 8. The outer portion 26b of the indexing pin 26 is received in the opening 30 of the first arm 24a. In the illustrated embodiment, the outer portion 26b of the indexing pin 26 has a polygonal cross-sectional shape and the opening 30 in the first arm 24a has a similar shape to prevent relative rotation between the indexing pin 26 and first arm 24a. Thus, when the flip portion 104 is moved between open and closed positions, both the indexing pin 26 and the second hinge part 24 rotate relative to the first hinge section 22.

Openings 30, 40 are sized to allow axial movement of the indexing pin 26. When the indexing pin 26 is moved axially, the non-circular outer portion 26b may be positioned within the opening 40. In this case, the opening 40 is sized to receive the non-circular outer portion 26b of the indexing pin 26 and still allow free rotation of the indexing pin 26. In one embodiment, the inner portion 26a of the indexing pin 26 may be supported in bracket 27 (see FIG. 2) to provide support for the indexing pin 26 and guide the axial movement of the indexing pin 26.

Figure 3:
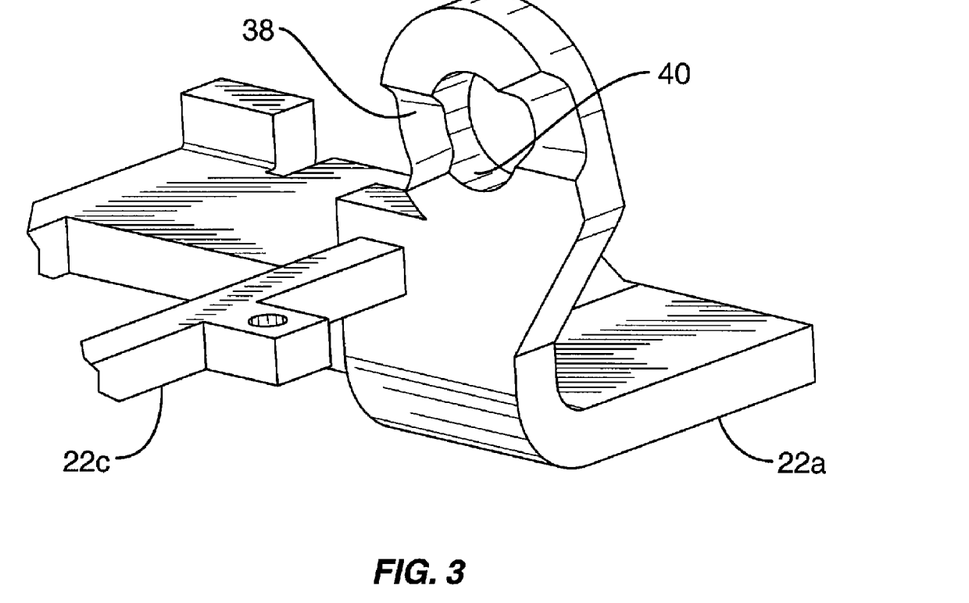
FIG. 3 is a perspective view of a first hinge part according to one embodiment.

As previously indicated, the indexing pin 26 and first hinge part 22 include mating indexing features to provide one or more stop positions for the flip portion 104. In the exemplary embodiment shown, the indexing features comprise one or more depressions 38 on the first hinge part 22 (FIG. 3) and one or more matching detents 52 (FIG. 4) on the flange 42 of the indexing pin 26. When the flip portion 104 is in predetermined angular positions relative to the base portion 102, the detents 52 on the flange 42 of the indexing pin 26 engage with corresponding depressions 38 on the first hinge part 22 as shown in FIG. 4. The engagement of the detents 52 with the depressions 38 holds the flip portion 104 at one of the predetermined angular positions. In another embodiment, the depressions are formed in a part, such as a washer (not shown), that is affixed to the first hinge part 22 around the opening 40. Such an arrangement may allow a single first hinge part 22 to be used in multiple applications that require a different size or positioning of the depressions.

Multiple detents 52 and depressions 38 may facilitate stopping the movement of the flip portion 104 in various positions. For example, one depression 38 and/or detent 52 may correspond to the closed position. Another depression 38 and/or detent 52 may correspond to an open position for normal use of the cellular telephone 100 where the base portion 102 and the flip portion 104 are oriented at an angle less than 180 degrees as illustrated in FIG. 1. Yet another depression 38 and/or detent 52 may correspond to a flat open position where the base portion 104 and flip portion 102 are oriented at about 180 degrees. This orientation may facilitate the use of a QWERTY style keyboard positioned partially on the base portion 102 and partially on the flip portion 104.

The spring 28, shown best in FIG. 5, performs two functions. First, it applies a rotational force to the indexing pin 26 to bias the flip portion 104 to an open position. Second, the spring 28 applies an axial force to bias the indexing pin 26 to an engaged position relative to the first hinge part 22. In the exemplary embodiment shown, the spring 28 is inserted over the inner portion 26a of the indexing pin 26. The spring 28 includes first and second arms 46, 48. The first arm 46 inserts into an opening in a mounting tab 50 attached to the support bar 22c. The second arm 48 engages a spring post 44 extending from the flange 42 of the indexing pin 26. This arrangement torsionally loads the spring 28 when the flip portion 104 is moved to the closed position. The torsionally loaded spring 28 then exerts a rotational force on the indexing pin 26 that, when released, urges the flip portion 104 to the open position.

The second arm 48 may be bent to allow a portion of the second arm 48 to contact the flange 42. This allows the spring 28 to be slightly compressed so that the spring 28 biases the indexing pin 26 to an engaged position. In one embodiment, one or both of the indexing pin 26 and the first hinge part 22 are at least partially constructed of a magnetic material such that the indexing pin 26 and the first hinge part 22 are magnetically attracted to one another. This magnetic attraction may supplement the compressive force of the spring 28, or may replace the compressive force entirely. In one embodiment, separate magnets (not shown) are attached to the indexing pin 26 and first hinge part 22 rather than constructing these components of magnetic material.

Figure 6:
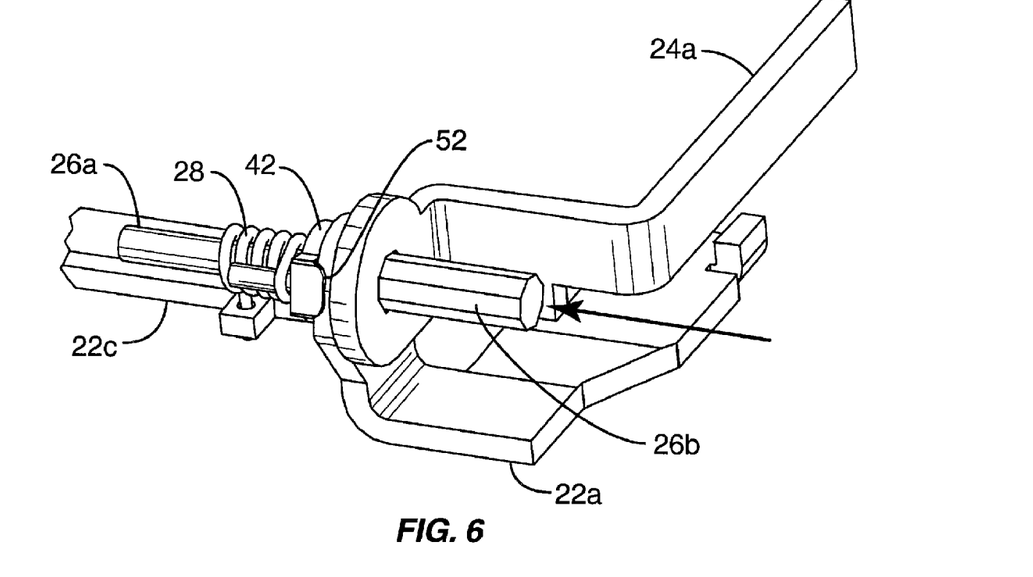
FIG. 6 is a perspective view of a portion of a hinge mechanism with a spring according to one embodiment.

Biasing the indexing pin 26 to the engaged position enables the user to easily open the flip portion 104 literally at the press of a button 23. The button 23 may be biased by a second spring 29 in an outward position relative to the outer surface of the cellular telephone 100 (see FIG. 2). When the flip portion 104 is closed, the spring 28 is torsionally loaded but prevented from opening the flip portion 104 because the engagement of the indexing features holds the flip portion 104 in the closed position. As illustrated in FIG. 6, the user may apply axial force (as indicated by the arrow) to the end of the indexing pin 26 via the button 23 to move the indexing pin 26 to a disengaged position. Moving the indexing pin 26 to the disengaged position releases the flip portion 104 and allows the spring 28 to open the flip portion 104. The user may then manually close the flip portion 104 which loads the spring 28 and causes the indexing features to reengage so that the process may be repeated.

Although the above discussion generally relates to an embodiment in which the spring 28 urges the flip portion 104 to the open position, another embodiment uses the spring to urge the flip to the closed position. In this embodiment, the spring 28 is oriented such that the action of manually opening the phone by the user loads the spring 28. The detent 52 and depression 38 are positioned to lock the flip portion 104 in the open position. As described above, the user presses the button 23 which causes the indexing pin 26 to move axially and disengages the detent 52 from the depression 38. The loaded spring 28 then urges the flip portion 104 to the closed position.

Figure 7:
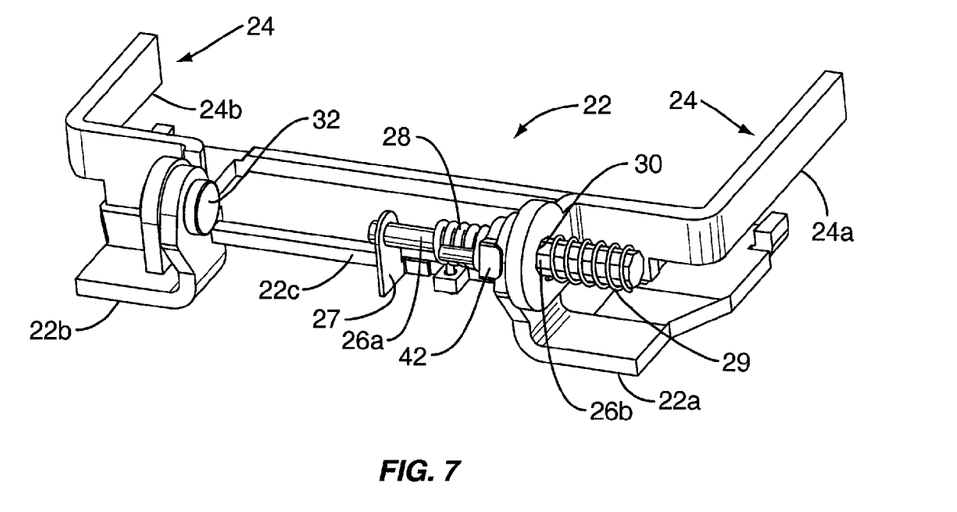
FIG. 7 is a perspective view of a hinge mechanism according to one embodiment.

FIGS. 7 and 8 illustrate assembled views of the hinge mechanism 20 when the flip portion 104 is in the closed position. In the embodiment of FIG. 7, the inner portion 26a of the indexing pin 26 is supported by the bracket 27. FIG. 8 illustrates another embodiment that allows the bracket 27 to be eliminated. Inner portion 26a is lengthened to extend through aligned openings 31, 41 in place of the hinge pin 32. The openings 31, 41 provide support and axial guidance for the indexing pin 26.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A hinge mechanism for a wireless communication device, comprising:
    a first hinge part;
    an indexing pin rotatable relative to the first hinge part about a pivot axis and movable axially along the pivot axis;
    a second hinge part rotatable about the pivot axis relative to the first hinge part between closed and open positions and non-rotatably engaged with the indexing pin; and
    a spring applying an axial force to the indexing pin to bias the indexing pin into contact with the first hinge part, and further applying a rotational force to the indexing pin to rotate the indexing pin about the pivot axis to move the second hinge part from the closed position to the open position.

2. The hinge mechanism of claim 1, wherein the first hinge part and the indexing pin include mating indexing features to prevent rotation of the indexing pin and hold the second hinge part in the closed position when the indexing features are engaged.

3. The hinge mechanism of claim 2, wherein a magnetic force at least partially biases the indexing features into an engaged position.

4. The hinge mechanism of claim 2, wherein the indexing pin moves axially to disengage the indexing features to allow rotation of the indexing pin.

5. The hinge mechanism of claim 2, wherein the indexing feature on one of the first hinge part and the indexing pin includes a detent, and the indexing feature on the other of the first hinge part and the indexing pin includes a depression shaped to accept the detent.

6. The hinge mechanism of claim 1, wherein the spring functions as both a torsion spring and a compression spring.

7. The hinge mechanism of claim 1, wherein the spring includes a first arm engaged with the first hinge part and a second arm engaged with the indexing pin to apply rotational force to the indexing pin.

8. The hinge mechanism of claim 7, wherein the indexing pin includes a lever arm, the lever arm including a mounting post engaged by the second arm of the spring.

9. The hinge mechanism of claim 1, wherein the indexing pin is positioned within an opening in the first hinge part, the opening shaped to allow rotation of the indexing pin relative to the first hinge part.

10. The hinge mechanism of claim 1, wherein the indexing pin is positioned within an opening in the second hinge mechanism, the indexing pin having a non-circular cross-sectional shape and the opening having the same non-circular shape, thereby causing the second hinge mechanism to rotate with the indexing pin.

11. A portable electronic device comprising:
    a first housing section;
    a second housing section;
    a hinge mechanism pivotally connecting the first and second housing sections for relative movement between open and closed positions, the hinge mechanism including a first hinge part, an indexing pin rotatable relative to the first hinge part about a pivot axis and movable axially along the pivot axis, a second hinge part rotatable about the pivot axis relative to the first hinge part between closed and open positions and non-rotatably engaged with the indexing pin, and a spring applying an axial force to the indexing pin to bias the indexing pin into contact with the first hinge part, and further applying a rotational force to the indexing pin to rotate the indexing pin about the pivot axis to move the second hinge part from the closed position to the open position.

12. The portable electronic device of claim 11, wherein the first hinge part and the indexing pin include mating indexing features to prevent rotation of the indexing pin and hold the second hinge part in the closed position when the indexing features are engaged.

13. The hinge mechanism of claim 12, wherein a magnetic force at least partially biases the indexing features into an engaged position.

14. The hinge mechanism of claim 12, wherein the indexing pin moves axially to disengage the indexing features to allow rotation of the indexing pin.

15. The hinge mechanism of claim 12, wherein the indexing feature on one of the first hinge part and the indexing pin includes a detent, and the indexing feature on the other of the first hinge part and the indexing pin includes a depression shaped to accept the detent.

16. The hinge mechanism of claim 11, wherein the spring functions as both a torsion spring and a compression spring.

17. The hinge mechanism of claim 11, wherein the spring includes a first arm engaged with the first hinge part and a second arm engaged with the indexing pin to apply rotational force to the indexing pin.

18. The hinge mechanism of claim 17, wherein the indexing pin includes a lever arm, the lever arm including a mounting post engaged by the second arm of the spring.

19. The hinge mechanism of claim 11, wherein the indexing pin is positioned within an opening in the first hinge part, the opening shaped to allow rotation of the indexing pin relative to the first hinge part.

20. The hinge mechanism of claim 11, wherein the indexing pin is positioned within an opening in the second hinge mechanism, the indexing pin having a non-circular cross-sectional shape and the opening having the same non-circular shape, thereby causing the second hinge mechanism to rotate with the indexing pin.

21. A hinge mechanism for a wireless communication device, comprising:
    first and second hinge parts connected respectively to first and second housing sections;

an axially movable indexing pin rotatably connecting the first and second hinge parts, said indexing pin rotatably engaged with the first hinge part and non-rotatably engaged with the second hinge part; and a spring applying an axial force to the indexing pin to bias the indexing pin into contact with the first hinge part, and further applying a rotational force to the indexing pin to rotate the indexing pin about the pivot axis to effect relative rotation between the first and second hinge parts.

\* \* \* \* \*

UNITED STATES PATENT AND TRADEMARK OFFICE
CERTIFICATE OF CORRECTION

PATENT NO. : 8,132,292 B2
APPLICATION NO. : 12/352244
DATED : March 13, 2012
INVENTOR(S) : Patterson It is certified that error appears in the above-identified patent and that said Letters Patent is hereby corrected as shown below:

Column 6, claims 13-20, delete "The hinge mechanism of" and insert --The portable electronic device of--.

Signed and Sealed this
Twenty-fifth Day of December, 2012

David J. Kappos
*Director of the United States Patent and Trademark Office*